United States Patent [19]

Purnell

[11] Patent Number: 4,882,873

[45] Date of Patent: Nov. 28, 1989

[54] INSECT ELIMINATION KIT AND METHODS FOR ITS USE

[76] Inventor: Gabriel L. Purnell, Rte. 2, Box 100C, Berlin, Md. 21811

[21] Appl. No.: 33,271

[22] Filed: Apr. 2, 1987

[51] Int. Cl.⁴ ............................................. A01M 7/00
[52] U.S. Cl. ..................................... 43/132.1; 43/125
[58] Field of Search ....................... 43/132.1, 124, 125

[56] References Cited

U.S. PATENT DOCUMENTS 4,534,128  8/1985  Query et al. ...................... 43/132.1
4,594,807  6/1986  McQueen ......................... 43/132.1

Primary Examiner—Richard K. Seidel
Assistant Examiner—William Scott Andes
Attorney, Agent, or Firm—Sughrue, Mion, Zinn, Macpeak & Seas

[57] ABSTRACT

A kit for eliminating fleas, roaches, ants and other crawling insects from a confined area is described, as well as a method for its use. The kit comprises a container filled with a residual insecticide (most preferably a 0.50% chlorpyrifos formulation); an adjustable spray dispenser therefor; a high-strength flushing agent in an aerosol container (most preferably 1.07% pyrethrins); a standard fogging nozzle for dispensing the flushing agent from the aerosol container; an additional fogging nozzle having a long, thin, tubular extension for dispensing the flushing agent into cracks, crevices and voids in the area; at least one white monitoring insect trapping device having glue on at least one surface thereof; and an information sheet explaining how to use the kit in accordance with the method also described herein. Where roaches and ants are particularly sought to be eradicated, baited insect devices are also included. The kit components are neatly packaged within a secure, portable container, and the kit is intended essentially for consumer use in dwelling abodes and office areas. The described method comprises applying the residual insecticide and flushing agent, monitoring the insect population with the trapping devices and then selectively reapplying the flushing agent as necessary within designated time periods based on the life cycles, harborage and sightings of fleas and roaches in particular. When used properly in accordance with the claimed method, the kit is able to achieve total flea, roach, ant and other crawling insect elimination from the confined area.

9 Claims, 2 Drawing Sheets

INSECT ELIMINATION KIT AND METHODS FOR ITS USE

FIELD OF THE INVENTION

The present invention is directed to a method for eliminating insects, particularly fleas, roaches and ants, from a confined area such as a household residence or business office, by employing the insect elimination kit described hereinbelow.

BACKGROUND OF THE INVENTION

Flea, roach, ant, and other crawling insect infestation in human dwelling areas and business areas is not only a nuisance, but can also be the cause of public health concerns, since such insects have been known to carry certain diseases. For example, cockroaches are among the oldest living forms of life on our planet, are remarkable survivors, can go weeks without food or water and have adapted to conditions in nearly every environment imaginable. Common American cockroaches, such as the Oriental, the brown-banded, the smokey brown, and the most wide-spread, the German cockroach, are known to transmit at least 13 human diseases, including typhoid dysentery hepatitis allergies and leprosy.

There are many known pesticides used to combat fleas, roaches, ants and other crawling insects and, for the most part, these known insecticides are effective at killing live adult insects present in dwelling or business areas when properly used. However, there is no single insecticide pesticide, or treatment method using an insecticide that is capable of killing and eliminating all stages of the flea and roach life cycles. Thus, the insect infestation problem may recur several days to several weeks after such treatment. Further, in many instances, proper preparation is not performed prior to treatment, and insect hiding places such as cracks, crevices, voids and other unforeseen areas are often missed by the insecticide applicator, and often there is no timely follow-up treatment.

Most insecticides are sold as liquid formulations which can be sprayed, dry powders which are dispersed on the surfaces of the area to be treated, baited traps, adhesive-type traps and fogging bombs, commonly known as "flea bombs" which release an insecticide as a fog or mist (total release bombs). However total release bombs often do not reach areas where insects hide and moreover, they may be expensive to use, since a bomb is usually only effective in one room, and often they must be used more than once to be totally effective. Many common insecticides sold as fog sprays are messy, and the active ingredient is relatively weak. Powders are difficult to apply properly since if the powder contacts moisture, such will harden and thus no longer adhere to the insects. Moreover, powders are unsightly and even hazardous in certain areas, While adhesive-type or glue traps are excellent for monitoring insect population levels, such traps only work if the insect actually enters the device or trap. In many instances, insect infestation remains after treatment, and the insects may also become resistant to the chemical insecticides. Accordingly, few known insecticides or treatment methods are marketed with a claim to totally eliminate insect infestation from the dwelling or business area.

SUMMARY OF THE INVENTION

Accordingly, one object of the present invention is to provide an insect elimination kit which can effectively achieve total elimination of fleas, roaches, ants, and other crawling insects from a confined area by following the method for its use described in detail hereinbelow, by concentrating on effectively killing all stages of the flea and roach life cycles during treatment to prevent recurrence of infestation.

Another object of the present invention is to provide an insect elimination kit and method for its use which is made specifically for consumer usage and application, resulting in a more economical treatment method since no professional pest control operators are required.

Still another object of the present invention is to provide an insect elimination kit which conveniently contains all of the components necessary to achieve total elimination of fleas, roaches, ants, and other crawling insects in one easy-to-handle package, which also contains instructions for its method of use as described hereafter.

The above objects of the present invention can be attained by a kit for eliminating fleas and other crawling insects from a confined area comprising a container filled with a residual insecticide, most preferably a 0.5% chlorpyrifos formulation, an adjustable spray dispenser for this container, an aerosol container filled with a high-strength flushing agent, most preferably a 1.07% pyrethrins formulation, a standard fogging nozzle for dispensing the flushing agent from the aerosol container, an additional fogging nozzle having a long, thin tubular extension for spraying the flushing agent in cracks, crevices and voids in the area to be treated where insects, particularly roaches and ants, may live or hide, one or more white monitoring insect trapping devices having glue on at least one surface thereof, and an information sheet explaining how to use the contents of the kit to achieve total flea and insect elimination from the area, wherein the kit components are packaged within a secure, portable container. The insect elimination kit may also contain a pair of polyethylene gloves for protection during application of the insecticide and flushing agent.

Where the kit is to be used particularly to eliminate roaches and ants, the kit further contains about three to five baited insect traps for added protection and effectiveness.

For eliminating fleas and other crawling insects from the confined area, the components of the above described kit are used in the following sequence of steps:

(a) thoroughly cleaning the area to be treated;

(b) spraying the area with an effective insecticidal amount of a residual insecticide: where fleas are particularly sought to be eradicated, special attention should be payed to spraying floors and carpets;

(c) fogging the area with a flushing agent containing an effective insecticidal amount of pyrethrins, including optional fogging, if necessary, using a fogging nozzle having a long, thin, tubular extension to allow the flushing agent to penetrate into cracks, crevices and similar voids in the confined area where fleas or insects may live or hide;

(d) after vacating the area to allow the residual insecticide and flushing agent to dry, strategically placing at least one white monitoring flea or insect trapping device having glue on at least one surface thereof in the area to detect the presence of any live fleas or other crawling insects: and (e) after a period of about three or more days, selectively reapplying the flushing agent as necessary to portions of the area where the monitoring device or visual sightings have detected flea or insect life.

Where the above-described kit is to be used particularly for roaches or ants, and contains the additional baited insect traps, the same method as described above particularly for fleas is used, but the fogging nozzle with the tubular extension must be used in the fogging step, and during the spraying step with the residual insecticide, particular attention should be paid to spraying baseboards, cracks and crevices. Further, after the flushing agent and residual insecticide are allowed to dry, the baited traps are also strategically placed throughout the area, and after a period of several days, the flushing agent is selectively reapplied as necessary to portions of the area where the monitoring device or visual sightings have detected roach or ant life. Crack and crevice residual insecticide spraying treatment should be repeated, if necessary, after about 14–20 days.

The insect elimination kit and method for its use described above have proven to be extremely effective, even in heavy flea and roach infestation areas, in achieving total insect elimination when used in accordance with the precise sequence of steps described herein.

DETAILED DESCRIPTION OF THE INVENTION

Figure 1:
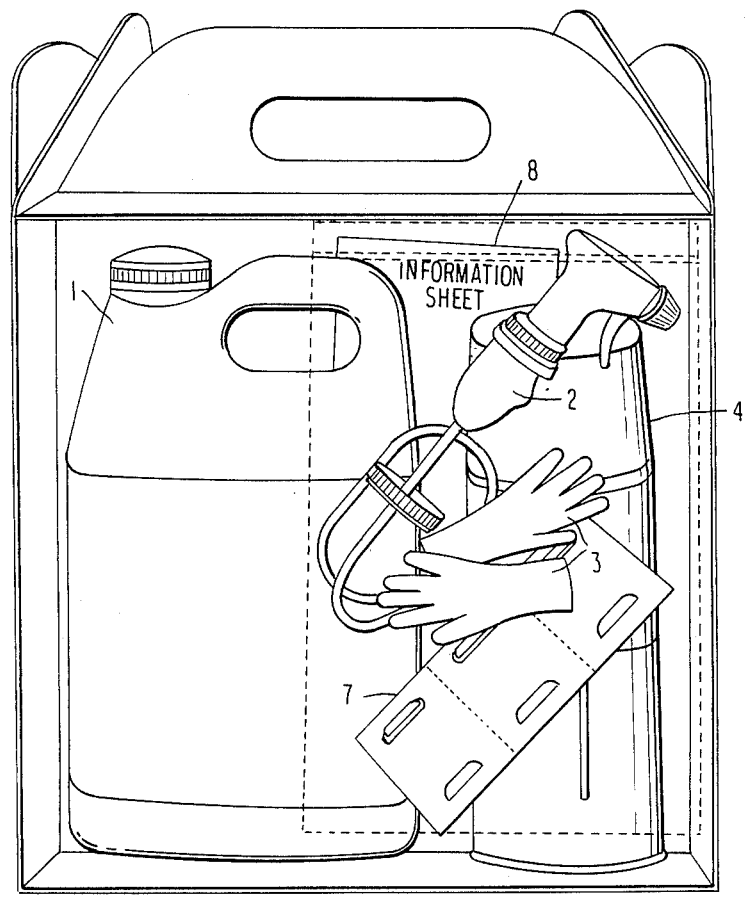
FIG. 1 illustrates one example of an insect elimination kit within the scope of the present invention, showing the portable nature of the kit, suitable for home consumer usage, and containing all necessary components to achieve total insect elimination.
Figure 2:
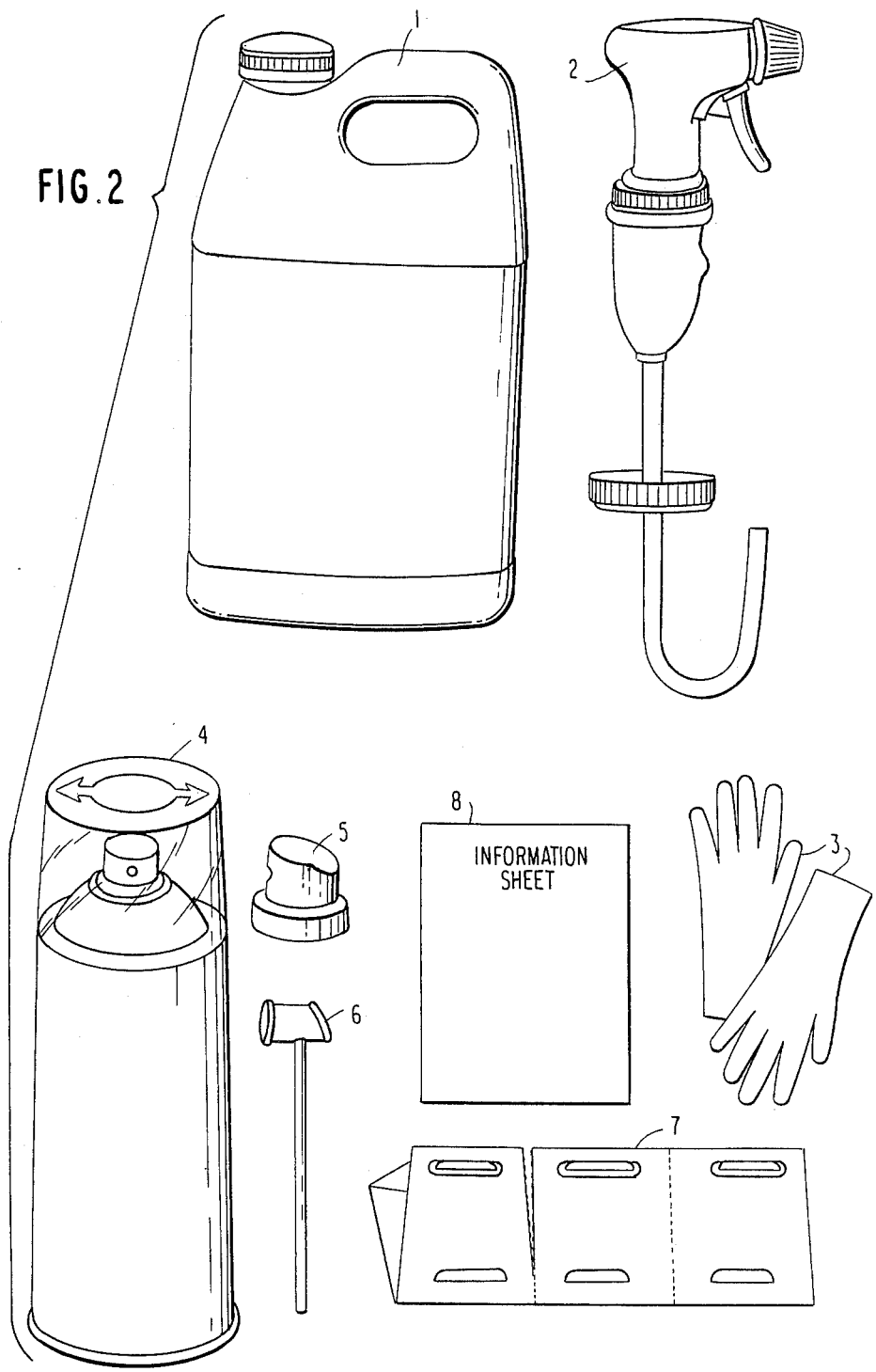
FIG. 2 is illustrative of an embodiment of the flea elimination kit components, specifically a 1-gallon container carrying the residual insecticide (1); an adjustable spray dispenser for the residual insecticide container (2); a pair of polyethylene gloves (3); a 12-ounce aerosol cylindrical, metal, child-proof container containing the flushing agent (active ingredient=pyrethrins) (4); a standard fogging nozzle for the aerosol container for area or space treatment fogging (5);, a crack and crevice fogging nozzle for the aerosol container (6); three white monitoring insect trapping devices having glue on one surface (7); and an information sheet explaining how to use the contents of the kit to achieve total elimination of flea and insect infestation from the area, including a telephone "hotline" number if further information is necessary (8).

The present invention will be described in detail hereinbelow by describing the components of the kit in conjunction with their intended sequential application.

First, the confined area, e.g., a dwelling area or a business office area, must be thoroughly cleaned prior to usage. This is a very important preparatory measure, and includes vacuuming all carpeting, mopping all wood and tile floors, paying particular attention to areas where flea-carrying pets may sleep or rest, including under furniture, in cracks and crevices, and along walls and baseboards. Closets should also be thoroughly cleaned. Note that with respect to the flea treatment all infected pets should be treated by a professional to prevent reinfestation of the confined area.

After thorough cleaning has taken place, the confined area is sprayed with an effective insecticidal amount of the residual insecticide, employing the adjustable spray dispenser contained within the kit. For example, one gallon of the insecticides described below are usually effective to treat approximately 800–1000 sq. ft. of the area to be treated. The residual insecticide is preferably selected from among the following liquid formations:

(1) A formulation containing from about 0.25 to about 0.50% chlorpyrifos (O,O-diethyl-(3,5,6-trichloro-2-pyridyl)phosphorothioate) as the active ingredient. Dursban L.O. Insecticide (a trademark of the Dow Chemical Co.) containing 0.50% chlorpyrifos is an example of such a commercially available formulation; Mr. Eliminator (a trademark of Environmental Care Center Inc.) is a further example of a 0.50% chlorpyrifos formulation suitable for use herein.

(2) A formulation containing from about 0.5 to about 3% of a synthetic pyrethroid as the active ingredient, such as Resmethrin ([5-(phenylmethyl)-3-furanyl]-methyl 2,2-dimethyl-3-(2-methyl-1-propenyl)cyclopropanecarboxylate). Respond Insecticide (a trademark of the Penick Corp.) is an example of a commercially available 3% Resmethrin formulation suitable for use herein.

(3) A formulation containing from about 0.5 to about 1.5% crabay (2-(1-methylethoxy)-phenol-methylcarbamate) as the active ingredient, such as Baygon (a trademark of Fabenfabriken Bayer, A.G.) commercially available as Purge Crack and Crevice Insecticide with Baygon, sold by Cline-Buckner, Inc.

While any of these residual insecticides can be used in the present invention, 0.5% chlorpyrifos (e.g., Dursban) and crabay e.g., Baygon) are preferred 0.5% chlorpyrifos is the maximum concentration certified for insecticidal usage by the Environmental Protective Agency.

After applying the residual insecticide, the area to be treated is fogged with the high-strength flushing agent containing an effective insecticidal amount of pyrethrins or a synthetic pyrethroid as the active ingredient. Also known as a "flush and kill" agent, this type of flushing agent exhibits excellent knockdown and quick insect killing effects. The preferred concentration of pyrethrins in the flushing agent is 0.5–5.0%. A 1.07% pyrethrins concentration is most preferred in the present invention. An example of a commercially available flushing agent which is particularly preferred for usage in the present invention is Virchem Seventy-Three Aerosol Insecticide (Virchem is a trademark of Virginia Chemicals. Inc.) which contains 1.07% pyrethrins; piperonyl butoxide technical 2.14% (equivalent to 1.71% (butylcarbityl) (6-propylpiperonyl) ether and 0.43% of other related compounds); N-octylbicycloheptene dicarboximide 2.14%: 11.60% petroleum distillates and the remainder inert ingredients.

As the synthetic pyrethoid-containing flushing agent, 0.5 to 3.0% Resmethrin formulations may be used if sold as an aerosol fog. An example of such a commercially available Resmethrin formulation is Respond Insecticide with SBP-1382 3% Multipurpose Spray Formulation III.

In applying the flushing agent, particular attention should be paid to spraying curtains, drapes, counters, closets, and other out-of-the-way areas with the standard fogging nozzle for the aerosol container. The crack and crevice fogging nozzle should then be secured onto the aerosol container, and the long, thin, tubular extension thereof should be used to spray the flushing agent into cracks, crevices, voids and other places throughout the confined area to be treated where insects may live or hide. Where roaches and ants are desired to be eradicated, it is important to pay particularly close attention to this spraying step with the crack and crevice nozzle to achieve total insect elimination. For eliminating fleas particularly, however, the tubular fogging nozzle may not be necessary.

It is important to closely follow the directions for spraying and fogging on the labels of the residual insecticide and flushing agent to achieve the purposes of the present invention. As noted, when spraying the residual insecticide to eliminate fleas, the floors and carpet should be sprayed thoroughly; when used particularly for roaches and ants, the baseboards, cracks and crevices should be sprayed thoroughly.

Although not essential, the polyethylene gloves contained in the insect elimination kit should be used when applying the residual insecticide and the flushing agent for protection of the applicator's hands during spraying and fogging.

After the residual insecticide and the flushing agent have been thoroughly applied to the confined area, the area should be vacated for a sufficient time to allow the residual insecticide to dry and the flushing agent to dissipate, preferably about 2½ to 3 hours. After drying, the white monitoring flea or insect trapping devices having glue on at least one surface thereof should be placed strategically throughout the confined area to monitor insect population levels and to detect the presence of any live fleas or other insects. These monitors should particularly be placed in locations where the sprays or fogs cannot be directly applied, such as electronic appliances and devices, telephones, microwave ovens, near smoke alarms and the like. The glue or adhesive on one side thereof is used to trap the insects which may come into contact with the glue. The color white is especially useful since white is known to attract fleas. An example of a commercially available monitoring device is Roach Pot (imported by Koram Import/Export Corp., New York).

Where the kit is to be used specifically to eliminate roaches and ants, baited insect devices should also be placed strategically throughout the confined area after the residual insecticide and flushing agent have dried. The use of such baited insect devices provides additional protection against any roaches or ants that may have entered the confined area after application of the residual insecticide/flushing agent, or which the applicator of the residual insecticide/flushing agent may have missed, and also aids in the long-term elimination of roach and ant populations. The placement of such baited insect devices is not essential if the consumer only desires to eliminate fleas or other crawling insects. An example of commercially available baited insect devices is MAXFORCE Roach Control System (a trademark of the American Cyanamid Company) which are available in packages containing 2-inch plastic bait station units, each containing a slow-acting stomach poison. Approximately 4-6 bait stations are recommended per 100 sq. ft. of infested area, including floor and shelf space. The Warrior, a trademark of Micro-gen Equipment Corp., is another example of commercially available bait stations.

In order to achieve total flea, roach, ant and other crawling insect elimination, it is imperative to accurately perform the last step of the method properly, as described hereafter. Using the white monitoring insect trapping devices mentioned above as an indicator, the high-strength flushing agent having a quick knockdown and killing effect is selectively reapplied to portions of the confined area as necessary where the monitoring devices or direct visual sightings have detected insect life. Where fleas are particularly sought to be eradicated, this selective reapplication should occur within about 3-14 days after the original treatment with the residual insecticide and the flushing agent. Where roaches are particularly desired to be eradicated, the selective reapplication of the flushing agent should occur after a period of about 3-20 days from the initial residual insecticide/flushing agent treatment. Retreatment of baseboards, cracks and crevices with the residual insecticide should be done after about 14-20 days, as necessary. The reasons why these time periods are important in each case are related to the life cycles of the flea and the roach. Fleas have a 4-stage life cycle—egg, larva, pupa, and adult. Conventional insecticides will usually affect fleas in only two of these stages—the mobile larval and adult stages, and thus, flea eggs and early larval stages may not be affected by the insecticide in conventional flea treatments. This is because conventionally used residual insecticides must be left undisturbed in the treated area until the fleas grow from the egg to the larval stages in order to be effective. However, in human dwelling areas and business offices where daily activity occurs, it is often impossible to leave the residual insecticide undisturbed, and thus, eggs and early larval stage fleas may not all be killed by residual insecticides. Moreover, the fleas may become resistant to the residual insecticide. Further, if a short-acting, good knockdown insecticide (such as pyrethrins formulations) is used alone, such will not be effective to kill eggs which have not yet hatched at the time of its application. Flea eggs hatch approximately 7-14 days after being laid, and thus this period is used as a guideline for selective reapplication of the flushing agent to kill any newly hatched fleas and mobile larva. This step is extremely important in order to achieve total flea elimination and avoid the possibility of a recurrence of infestation.

During this time period, the white insect monitors should be closely checked for active flea or other insect life which may have become trapped in the sticky adhesive, and the high-strength flushing agent should be reapplied to areas where insect life has been detected by the monitors or by visual sightings. Any fleas which are detected during this period will be fleas having hatched from eggs where the residual insecticide was not effective due to disturbances or due to resistance (either chemical resistance to insecticides or to resistance from detection) after the initial application thereof.

In the same manner, when roaches are specifically desired to be eradicated, the period of time for checking the white monitors and subsequent selective reapplication of the flushing agent as necessary is from about 3-20 days. It is well-known that roaches have a 3-stage life cycle—eggs, nymphs, adults, and that eggs will usually hatch within 14-20 days from the time they are laid. Thus, in the same manner as for flea life detection, the white monitors should be closely checked during this time period and if newly hatched nymphs are detected the high-strength pyrethrins or synthetic pyrethroid flushing agent should be reapplied to portions of the area where such nymphs are detected.

Re-infestation most commonly occurs after conventional insecticide treatments because if a residual insecticide is applied in the first instance, if such is disturbed during the time period when flea or roach eggs may hatch, such will not be effective to kill the resulting nymphs or larva. Further if live, mobile insects become resistant after application of the residual insecticide, the same problem will occur. Thus, the present invention is able to achieve total flea, roach, ant, and other crawling insect elimination from the area to be treated by the monitoring and selective reapplication steps described above in order to effectively prevent the possibility of re-infestation based on the known life cycles, harborage, and the ability to become resistant of fleas and roaches.

When the insect elimination kit described above is used in accordance with the precise sequential steps described above, total insect elimination, particularly flea, roach, and ant elimination can be attained due to the combination of the residual insecticide, the high-strength flush and kill agent, and insect monitoring, trapping and baiting devices used appropriately, followed by selective reapplication of the flushing agent in areas of harborage where necessary. The present invention has been determined to be most effective when the residual insecticide is a 0.5% chlorpyrifos formulation and the flushing agent is a super-strength 1.07% pyrethrins formulation. The insect elimination kit is designed for the average homeowner or small office worker to use without the need for hiring costly professional pest control operators. The kit also contains an information sheet which details the above-described steps in an easy-to-read and easy-to-understand manner. Commercially sold kits contain a money-back guarantee that the kit will achieve total flea, roach, ant or other crawling insect elimination when used in accordance with the above-described steps. The information sheet also contains a telephone "hotline" number which the consumer may use if further information or clarification of the instructions is needed.

Having described the present invention in detail, it will be apparent to those skilled in the art that various modifications may be made thereto without departing from the spirit and scope of the invention as defined in the claims below.

What is claimed is:

1. A method for eliminating fleas and other crawling insects from a confined area comprising:
   (a) thoroughly cleaning said area;
   (b) spraying said area with an effective insecticidal amount of a residual insecticide;
   (c) fogging said area with a flush and kill agent containing at least 1.07% pyrethrins or a synthetic pyrethroid;
   (d) after vacating said area to allow said residual insecticide to dry and said flush and kill agent to dissipate, strategically placing at least one white monitoring flea or insect trapping device having glue on at least one surface thereof in said area to detect the presence of any live fleas or other insects; and
   (e) after a prior of about 3-14 days, selectively reapplying said flush and kill agent as necessary to portions of said area where said monitoring device or visual sightings have detected flea or insect life.

2. A method for eliminating fleas and other crawling insects from a confined area as claimed in claim 1, wherein said residual insecticide is selected from a formulation containing from about 0.25 to about 0.50% chlorpyrifos as the active ingredient, a formulation containing from about 0.5 to about 3% of a synthetic pyrethroid as the active ingredient, a formulation containing from about 0.5 to about 1.5% carbay as the active ingredient.

3. A method for eliminating fleas and other crawling insects from a confined area as claimed in claim 2, wherein said residual insecticide is a 0.50% chlorpyrifos formulation, and said flush and kill agent is a 1.07% pyrethrins formulation.

4. A method for eliminating fleas and other crawling insects from a confined area as claimed in claim 1, said fogging including using a fogging nozzle having a long, thin tubular extension to allow said flush and kill agent to penetrate into cracks, crevices or similar voids in said area where fleas or insects may live or hide.

5. A kit for eliminating fleas and other crawling insects from a confined area for use in the method of claim 1 comprising:
   (a) a container filled with a residual insecticide;
   (b) an adjustable spray dispenser for said container;
   (c) an aeorsol container filled with a flush and kill agent containing at least 1.07% pyrethrins or a synthetic pyrethroid;
   (d) a standard fogging nozzle for dispensing said flush and kill agent from said aerosol container;
   (e) a fogging nozzle having a long, thin, tubular extension for spraying said flush and kill agent in cracks, crevices and voids in said area where fleas and insects may live or hide;
   (f) at least one white monitoring insect trapping device having glue on at least one surface thereof; and
   (g) an information sheet explaining how to use the contents of said kit to achieve total flea and insect elimination from said area,
wherein the kit components are packaged within a secure, portable container.

6. A kit for eliminating fleas and other crawling insects from a confined area as claimed in claim 1, said kit further containing a pair of polyethylene gloves for protection during application of the residual insecticide and flushing agent.

7. A kit for eliminating fleas and other crawling insects from a confined area as claimed in claim 1, wherein said information sheet further contains a telephone number which can be dialed to obtain specific instructions for using said kit.

8. A kit for eliminating fleas and other crawling insects from a confined area as claimed in claim 1, wherein said residual insecticide is selected from a formulation containing from about 0.25 to about 0.50% chlorpyrifos as the active ingredient, a formulation containing from about 0.5 to about 3% of a synthetic pyrethroid as the active ingredient and a formulation containing from about 0.5 to about 1.5% carbay as the active ingredient.

9. A kit for eliminating fleas and other crawling insects from a confined area as claimed in claim 8, wherein said residual insecticide is a 0.50% chlorpyrifos formulation, and said flush and kill agent is a 1.07% pyrethrins formulation.

* * * * *